US009691348B2

(12) United States Patent
Kim et al.

(10) Patent No.: US 9,691,348 B2
(45) Date of Patent: Jun. 27, 2017

(54) PIXEL CIRCUIT AND ORGANIC LIGHT-EMITTING DIODE (OLED) DISPLAY INCLUDING THE SAME

(71) Applicant: Samsung Display Co., Ltd., Yongin, Gyeonggi-Do (KR)

(72) Inventors: Hyung-Soo Kim, Seongnam-si (KR); Won-Kyu Kwak, Seongnam-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/634,338

(22) Filed: Feb. 27, 2015

(65) Prior Publication Data

US 2015/0364106 A1 Dec. 17, 2015

(30) Foreign Application Priority Data

Jun. 17, 2014 (KR) ........................ 10-2014-0073335

(51) Int. Cl.
*G06F 3/038* (2013.01)
*G09G 5/02* (2006.01)
*G09G 3/3283* (2016.01)

(52) U.S. Cl.
CPC ............ *G09G 5/02* (2013.01); *G09G 3/3283* (2013.01)

(58) Field of Classification Search
CPC .......... G09G 3/22; G09G 3/3208; G09G 3/30; G09G 3/3225; G09G 3/3233; G09G 3/3241; G09G 3/3266; G09G 3/3275; G09G 3/3258
See application file for complete search history.

(56) References Cited

U.S. PATENT DOCUMENTS

| | | | | |
|---|---|---|---|---|
| 8,558,767 B2 * | 10/2013 | Kwon | G09G 3/3233 | 315/169.3 |
| 2005/0116656 A1 * | 6/2005 | Shin | G09G 3/3233 | 315/169.3 |
| 2005/0140598 A1 * | 6/2005 | Kim | G09G 3/3241 | 345/76 |
| 2005/0200573 A1 * | 9/2005 | Kwak | G09G 3/3233 | 345/76 |

(Continued)

FOREIGN PATENT DOCUMENTS

| | | |
|---|---|---|
| KR | 10-2002-0080002 A | 10/2001 |
| KR | 10-0662998 B1 | 12/2006 |

(Continued)

*Primary Examiner* — Kent Chang
*Assistant Examiner* — William Lu
(74) *Attorney, Agent, or Firm* — Knobbe Martens Olson & Bear LLP

(57) ABSTRACT

A pixel circuit for an organic light-emitting diode (OLED) display is disclosed. In one aspect, the pixel circuit includes a current provider electrically connected to a current source and configured to perform a current sinking operation in response to a first scan signal and to adjust a driving current based on the current sinking operation. The pixel circuit also includes a digital driver configured to control a flow of the driving current provided from the current provider in response to a data signal and a second scan signal. The pixel circuit further includes a plurality of pixel selectors configured to provide the driving current received from the digital driver to an OLED in response to a third scan signal.

20 Claims, 7 Drawing Sheets

(56) References Cited

U.S. PATENT DOCUMENTS

| | | | | |
|---|---|---|---|---|
| 2005/0219166 | A1* | 10/2005 | Kim | G09G 3/3241 345/76 |
| 2006/0145964 | A1* | 7/2006 | Park | G09G 3/3233 345/76 |
| 2006/0170624 | A1 | 8/2006 | Yumoto et al. | |
| 2007/0001959 | A1* | 1/2007 | Lee | G09G 3/3241 345/92 |
| 2007/0024540 | A1* | 2/2007 | Ryu | G09G 3/3233 345/76 |
| 2007/0103405 | A1 | 5/2007 | Kwak et al. | |
| 2007/0200814 | A1* | 8/2007 | Kwon | G09G 3/2022 345/92 |
| 2008/0150847 | A1 | 6/2008 | Kim et al. | |
| 2008/0158114 | A1 | 7/2008 | Kim | |
| 2009/0027423 | A1* | 1/2009 | Kwon | G09G 3/3233 345/690 |
| 2009/0135107 | A1* | 5/2009 | Kim | G09G 3/3233 345/76 |
| 2011/0109612 | A1* | 5/2011 | Chaji | G09G 3/3283 345/211 |
| 2011/0175881 | A1 | 7/2011 | Kim | |
| 2014/0210696 | A1* | 7/2014 | Kim | G09G 3/3233 345/82 |

FOREIGN PATENT DOCUMENTS

| | | | |
|---|---|---|---|
| KR | 10-0821055 | B1 | 4/2008 |
| KR | 10-0824854 | B1 | 4/2008 |
| KR | 10-2009-0053266 | A | 5/2009 |
| KR | 10-1049809 | B1 | 7/2011 |
| KR | 10-2014-0097869 | A | 8/2014 |
| KR | 10-2015-0003461 | A | 1/2015 |

* cited by examiner

PIXEL CIRCUIT AND ORGANIC LIGHT-EMITTING DIODE (OLED) DISPLAY INCLUDING THE SAME

INCORPORATION BY REFERENCE TO ANY PRIORITY APPLICATIONS

This application claims priority under 35 U.S.C. §119 to Korean patent Application No. 10-2014-0073335 filed on Jun. 17, 2014, the disclosure of which is hereby incorporated by reference herein in its entirety.

BACKGROUND

Field

The described technology generally relates to display devices.

Description of the Related Technology

Generally, an organic light-emitting diode (OLED) display has advantages such as low power consumption, a wide viewing angle, a quick response time, and stability at low temperatures because the OLED display includes OLEDs.

The OLED display can be driven by a digital driving technique. This technique displays one frame by displaying a plurality of sub-frames. That is, one frame is divided into a plurality of sub-frames, each emission time of the sub-frames is differently set (e.g., by a factor of 2), and a specific gray level is displayed using a sum of emission times of the sub-frames. The digital driving technique has a simple structure compared to other driving techniques. Also, it has a high ability to express low gray scale.

SUMMARY OF CERTAIN INVENTIVE ASPECTS

One inventive aspect is a pixel circuit and an OLED display including the pixel circuit.

Another aspect is a pixel circuit including advantages of current driving technique and digital driving technique.

Another aspect is an OLED display including the pixel circuit.

Another aspect is a pixel circuit which includes a current providing unit connected to a current source and configured to perform a current sinking operation caused by the current source in response to a first scan signal and to adjust a driving current based on the current sinking operation, a digital driving unit configured to control a flow of the driving current provided from the current providing unit in response to a data signal and a second scan signal, and a plurality of pixel selecting units configured to provide the driving current provided from the digital driving unit to an OLED in response to a third scan signal.

The current providing unit may include a first transistor including a gate electrode connected to a first node, a first electrode to which a power supply voltage is applied, and a second electrode connected to a second node, a first capacitor including a first electrode to which the power supply voltage is applied and a second electrode connected to the first node, a second transistor including a gate electrode to which the first scan signal is applied, a first electrode connected to the first node, and a second electrode connected to the second node, and a third transistor including a gate electrode to which the first scan signal is applied, a first electrode connected to the second node, and a second electrode connected to the current source.

The digital driving unit may include a fourth transistor including a gate electrode to which the second scan signal is applied, a first electrode to which the data signal is applied, and a second electrode connected to a third node, a fifth transistor including a gate electrode connected to the third node, a first electrode connected to the current providing unit, and a second electrode connected to the pixel selecting units, and a second capacitor including a first electrode to which a power supply voltage is applied and a second electrode connected to the third node.

Each of the pixel selecting units may include a sixth transistor including a gate electrode to which the third scan signal is applied, a first electrode connected to the digital driving unit, and a second electrode connected to the OLED and a third capacitor including a first electrode to which a power supply voltage is applied and a second electrode connected to the gate electrode of the sixth transistor.

The third scan signal may be applied to the pixel selecting units via different scan lines.

The pixel selecting units may include a first pixel selecting unit configured to provide the driving current to a red color OLED, a second pixel selecting unit configured to provide the driving current to a green color OLED, and a third pixel selecting unit configured to provide the driving current to a blue color OLED.

Another aspect is a pixel circuit which includes a current providing unit connected to a current source and configured to perform a current sinking operation caused by the current source in response to a first scan signal and to adjust a driving current based on the current sinking operation, and a plurality of pixel driving units configured to provide the driving current provided from the current providing unit to an OLED in response to a data signal and a fourth scan signal.

The current providing unit may include a first transistor including a gate electrode connected to a first node, a first electrode to which a power supply voltage is applied, and a second electrode connected to a second node, a first capacitor including a first electrode to which the power supply voltage is applied and a second electrode connected to the first node, a second transistor including a gate electrode to which the first scan signal is applied, a first electrode connected to the first node, and a second electrode connected to the second node, and a third transistor including a gate electrode to which the first scan signal is applied, a first electrode connected to the second node, and a second electrode connected to the current source.

Each of the pixel driving units may include a seventh transistor including a gate electrode to which the fourth scan signal is applied, a first electrode to which the data signal is applied, and a second electrode connected to a fourth node, an eighth transistor including a gate electrode connected to the fourth node, a first electrode connected to the current providing unit, and a second electrode connected to the OLED, and a fourth capacitor including a first electrode to which a power supply voltage is applied and a second electrode connected to the fourth node.

The fourth scan signal may be applied to the pixel driving units via the same scan line.

The fourth scan signal may be applied to the pixel driving units via different scan lines.

The pixel driving units may include a first pixel driving unit configured to provide the driving current to a red color OLED, a second pixel driving unit configured to provide the driving current to a green color OLED, and a third pixel driving unit configured to provide the driving current to a blue color OLED.

Another aspect is an OLED display which includes a display panel including a plurality of pixel circuits, a scan driving unit configured to provide a first scan signal, a second scan signal, and a third scan signal to the pixel circuits, a data driving unit configured to provide a data signal to the pixel circuits and to determine a driving current using a current source included in the data driving unit, and a timing control unit configured to control the scan driving unit and the data driving unit. Each of the pixel circuits may include a current providing unit connected to the current source and configured to perform a current sinking operation caused by the current source in response to the first scan signal and to adjust the driving current based on the current sinking operation, a digital driving unit configured to control a flow of the driving current provided from the current providing unit in response to the data signal and the second scan signal, and a plurality of pixel selecting units configured to provide the driving current provided from the digital driving unit to an OLED in response to the third scan signal.

The data driving unit may include a voltage driving unit configured to provide the data signal to the pixel circuits, and a current driving unit configured to determine the driving current by performing the current sinking operation on each of the pixel circuits.

The voltage driving unit may provide the data signal using a digital driving technique in which one frame is divided into a plurality of sub-frames.

The current driving unit may store a value of a driving voltage in a memory device, the driving voltage being determined to control the driving current to flow through the OLED.

The current driving unit periodically may refresh the current providing unit using the value of the driving voltage stored in the memory device.

A sinking current flowing through the current source may be determined to be the driving current. The third scan signal may be applied to the pixel selecting units via different scan lines.

The pixel selecting units may include a first pixel selecting unit configured to provide the driving current to a red color OLED, a second pixel selecting unit configured to provide the driving current to a green color OLED, and a third pixel selecting unit configured to provide the driving current to a blue color OLED.

Another aspect is a pixel circuit for an organic light-emitting diode (OLED) display, the pixel circuit comprising: a current provider electrically connected to a current source and configured to perform a current sinking operation in response to a first scan signal and to adjust a driving current based on the current sinking operation; a digital driver configured to control a flow of the driving current provided from the current provider in response to a data signal and a second scan signal; and a plurality of pixel selectors configured to provide the driving current received from the digital driver to an OLED in response to a third scan signal.

In the above circuit, the current provider includes: a first transistor including a gate electrode connected to a first node, a first electrode to which a first power supply voltage is applied, and a second electrode connected to a second node; a first capacitor including a first electrode to which the first power supply voltage is applied and a second electrode connected to the first node; a second transistor including a gate electrode to which the first scan signal is applied, a first electrode connected to the first node, and a second electrode connected to the second node; and a third transistor including a gate electrode to which the first scan signal is applied, a first electrode connected to the second node, and a second electrode connected to the current source.

In the above circuit, the digital driver includes: a fourth transistor including a gate electrode to which the second scan signal is applied, a first electrode to which the data signal is applied, and a second electrode connected to a third node; a fifth transistor including a gate electrode connected to the third node, a first electrode connected to the current provider, and a second electrode connected to the pixel selectors; and a second capacitor including a first electrode to which the first power supply voltage is applied and a second electrode connected to the third node.

In the above circuit, each of the pixel selectors includes: a sixth transistor including a gate electrode to which the third scan signal is applied, a first electrode connected to the digital driver, and a second electrode connected to the OLED; and a third capacitor including a first electrode to which a second power supply voltage is applied and a second electrode connected to the gate electrode of the sixth transistor.

In the above circuit, the pixel selectors are configured to receive the third scan signal via different scan lines. In the above circuit, the pixel selectors include a first pixel selector configured to provide the driving current to a red color OLED, a second pixel selector configured to provide the driving current to a green color OLED, and a third pixel selector configured to provide the driving current to a blue color OLED.

Another aspect is a pixel circuit for an organic light-emitting diode (OLED) display, the pixel circuit comprising: a current provider electrically connected to a current source and configured to perform a current sinking operation in response to a first scan signal and to adjust a driving current based on the current sinking operation; and a plurality of pixel drivers configured to provide the driving current received from the current provider to an OLED in response to a data signal and a fourth scan signal.

In the above circuit, the current provider includes: a first transistor including a gate electrode connected to a first node, a first electrode to which a first power supply voltage is applied, and a second electrode connected to a second node; a first capacitor including a first electrode to which the first power supply voltage is applied and a second electrode connected to the first node; a second transistor including a gate electrode to which the first scan signal is applied, a first electrode connected to the first node, and a second electrode connected to the second node; and a third transistor including a gate electrode to which the first scan signal is applied, a first electrode connected to the second node, and a second electrode connected to the current source.

In the above circuit, each of the pixel drivers includes: a seventh transistor including a gate electrode to which the fourth scan signal is applied, a first electrode to which the data signal is applied, and a second electrode connected to a fourth node; an eighth transistor including a gate electrode connected to the fourth node, a first electrode connected to the current provider, and a second electrode connected to the OLED; and a fourth capacitor including a first electrode to which a second power supply voltage is applied and a second electrode connected to the fourth node.

In the above circuit, the pixel drivers are configured to receive the fourth scan signal via the same scan line. In the above circuit, the pixel drivers are configured to receive the fourth scan signal via different scan lines. In the above circuit, the pixel drivers include a first pixel driver configured to provide the driving current to a red color OLED, a second pixel driver configured to provide the driving current to a green color OLED, and a third pixel driver configured to provide the driving current to a blue color OLED.

Another aspect is an organic light-emitting diode (OLED) display comprising: a display panel including a plurality of pixel circuits; a scan driver configured to provide a first scan signal, a second scan signal, and a third scan signal to the pixel circuits; a data driver configured to provide a data signal to the pixel circuits and to determine a driving current based on a current source included in the data driver; and a timing controller configured to control the scan driver and the data driver, wherein each of the pixel circuits includes: a current provider electrically connected to the current source and configured to perform a current sinking operation in response to the first scan signal and to adjust the driving current based on the current sinking operation; a digital driver configured to control a flow of the driving current provided from the current provider in response to the data signal and the second scan signal; and a plurality of pixel selectors configured to provide the driving current received from the digital driver to an OLED in response to the third scan signal.

In the above circuit, the data driver includes: a voltage driver configured to provide the data signal to the pixel circuits; and a current driver configured to determine the driving current based on the current sinking operation on each of the pixel circuits. In the above circuit, the voltage driver is configured to provide the data signal based on a digital driving technique in which one frame is divided into a plurality of sub-frames. In the above circuit, the current driver stores a value of a driving voltage in a memory device, the driving voltage being determined to control the driving current to flow through the OLED. In the above circuit, the current driver is configured to substantially periodically refresh the current provider based on the value of the driving voltage stored in the memory device.

In the above circuit, a sinking current flowing through the current source represents the driving current. In the above circuit, the pixel selectors are configured to receive the third scan signal via different scan lines. In the above circuit, the pixel selectors include a first pixel selector configured to provide the driving current to a red color OLED, a second pixel selector configured to provide the driving current to a green color OLED, and a third pixel selector configured to provide the driving current to a blue color OLED.

At least one of the disclosed embodiments reduces the effect of characteristic variation of transistor, hysteresis of transistor, and voltage drop, thereby stably driving OLEDs. The pixel circuit has simple structure and improves ability to express low gray scale. In addition, the pixel circuit includes a plurality of sub-pixels sharing a current providing unit, thereby reducing the number of transistors and capacitors.

Furthermore, an OLED display according to example embodiments can stably and efficiently drive a large scale display panel.

DETAILED DESCRIPTION OF CERTAIN INVENTIVE EMBODIMENTS

An OLED display can be driven by a current driving technique. This technique determines a driving current flowing through a driving transistor included in each pixel circuit and stores a driving voltage corresponding to the driving current in a storage capacitor, thereby controlling the driving current to flow though the OLED. This reduces the effect of characteristic variation of transistor, hysteresis of transistor, and voltage drop. However, it is not suitable for large scale display device and has a low ability to express low gray scale.

In this disclosure, the term "substantially" includes the meanings of completely, almost completely or to any significant degree under some applications and in accordance with those skilled in the art. Moreover, "formed on" can also mean "formed over." The term "connected" includes an electrical connection.

Exemplary embodiments will be described more fully hereinafter with reference to the accompanying drawings, in which various embodiments are shown.

Figure 1:
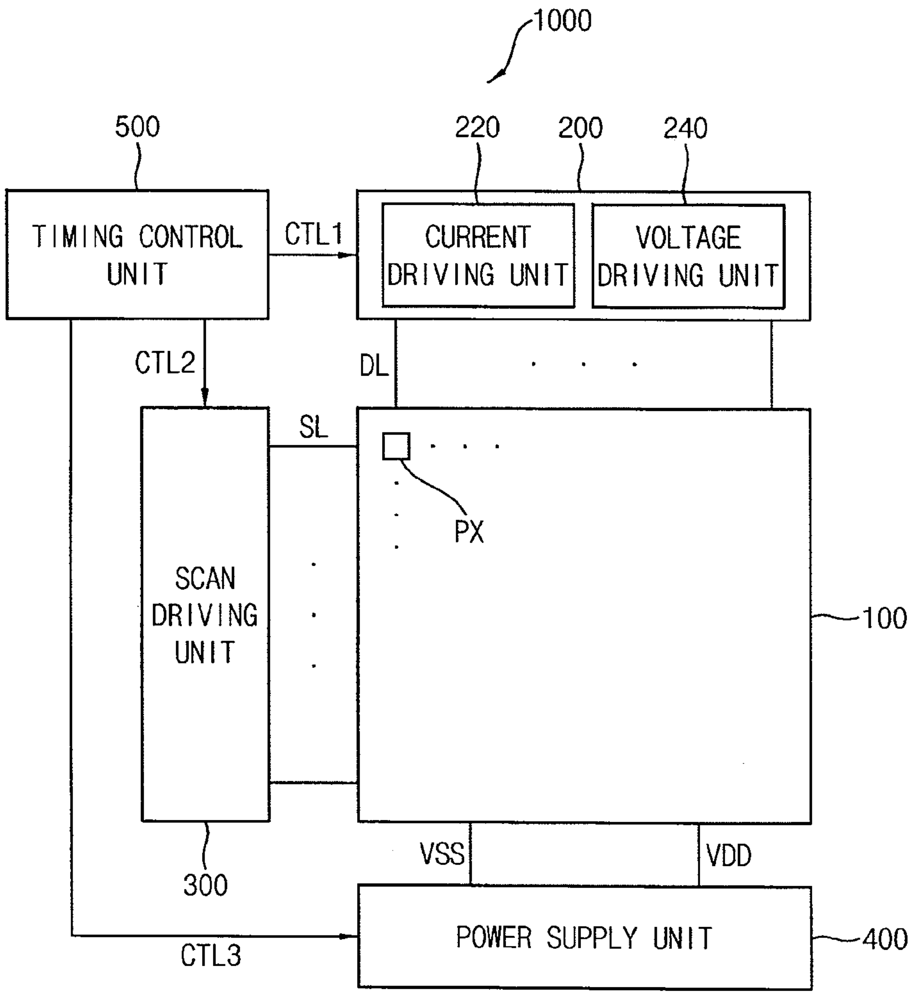
FIG. 1 is a block diagram illustrating an OLED display according to example embodiments.

FIG. 1 is a block diagram illustrating an OLED display according to example embodiments.

Referring to FIG. 1, an OLED display 1000 may include a display panel 100, a data driving unit or data driver 200, a scan driving unit or scan driver 300, a power supply unit or power supply 400, and a timing control unit or timing controller 500.

The display panel 100 may include a plurality of pixel circuits PX. The display panel 100 may be connected to the data driving unit 200 via data lines DL. The display panel 100 may be connected to the scan driving unit 300 via scan lines SL.

Each pixel circuit PX may include a plurality of sub-pixels sharing a current providing unit, thereby reducing the number of transistors and capacitors. In addition, the pixel circuit PX may be driven using a driving technique having advantages of a current driving technique and a digital driving technique. In one example embodiment, the pixel circuit PX may include a current providing unit, a digital driving unit and a plurality of pixel selecting units. The current providing unit may be connected to a current source. The current providing unit may perform a current sinking operation caused by the current source in response to a first scan signal and may adjust a driving current based on the current sinking operation. The digital driving unit may control a flow of the driving current provided from the current providing unit in response to a data signal and a second scan signal. Each pixel selecting unit may provide the driving current provided from the digital driving unit to an OLED in response to a third scan signal. In another example embodiment, the pixel circuit PX may include a current providing unit and a plurality of pixel driving units. The current providing unit may be connected to a current source. The current providing unit may perform a current sinking operation caused by the current source in response to a first scan signal and may adjust a driving current based on the current sinking operation. Each pixel driving units may provide the driving current provided from the current providing unit to an OLED in response to a data signal and a fourth scan signal.

The data driving unit 200 may provide a data signal to the pixel circuits PX and may determine the driving current using the current source included in the data driving unit 200. In one example embodiment, the data driving unit 200 may include a current driving unit 220 and a voltage driving unit 240.

The current driving unit 220 may determine the driving current by performing the current sinking operation on each of the pixel circuits PX. Thus, the current driving unit 220 may have the current sinking operation and may perform the current sinking operation, thereby determining the driving current and controlling the driving current to flow through the OLED. A sinking current flowing through the current source may be determined to be the driving current. The current driving unit 220 may periodically perform a refresh operation to maintain the driving current. In one example embodiment, a driving voltage is determined to control the driving current to flow through the OLED and the current driving unit 220 may store a value of the driving voltage in a memory device. Also, the current driving unit 220 periodically refreshes the current providing unit using the value of the driving voltage stored in the memory device. Thus, the current driving unit 220 may store the value of the driving voltage in the memory device to flow the driving current through the OLED. Thereafter, the current driving unit 220 may periodically apply the driving voltage to a capacitor included in the current providing unit. The refresh operation may be performed based on the driving current. However, it is proper that the refresh operation may be performed based on the driving voltage because of the charging time. The memory device may be located in various positions. In one example embodiment, the memory device may be a frame memory located in the timing control unit 500. The value of the driving voltage may be stored in the frame memory included in the timing control unit 500 without additional memory device, thereby reducing manufacturing costs. In another example embodiment, the memory device may be located in the data driving unit 200.

The voltage driving unit 240 may provide the data signal to the pixel circuits PX via data lines DL. The voltage driving unit 240 may provide the data signal using a digital driving technique in which one frame is divided into a plurality of sub-frames. In one example embodiment, the voltage driving unit 240 may provide the data signal using a digital driving technique of a progressive scan manner. The progressive scan manner sequentially performs scan operations of all scan-lines during scan time for each sub-frame, and simultaneously performs emission operations of all scan-lines during emission time for each sub-frame. In another example embodiment, the voltage driving unit 240 may provide the data signal using a digital driving technique of a random scan manner. The random scan manner randomly performs scan operations of all scan-lines for each sub-frame by shifting each sub-frame scan timing of the scan-lines by a specific time, and thus randomly (i.e., separately) performs emission operations of all scan-lines for each sub-frame.

The scan driving unit 300 may provide scan signals to the pixel circuits PX. In one example embodiment, the scan driving unit 300 provides a first scan signal, a second scan signal, and a third scan signal to the pixel circuits PX. The first scan signal is a control signal to perform the current sinking operation. The second scan signal is a control signal to drive the OLED using the digital driving technique. The third scan signal is a control signal to select a sub-pixel driven by the driving current. For example, the third scan signal may be applied to the pixel selecting units via different scan lines, thereby driving the sub-pixels respectively. In another example embodiment, the scan driving unit 300 provides the first scan signal and the fourth scan signal to the pixel circuits PX. The first scan signal is a control signal to perform the current sinking operation. The fourth scan signal is a control signal to select the sub-pixel and to drive the sub-pixel by digital driving technique.

The power supply unit 400 may supply a high voltage power VDD and a low voltage power VSS to the pixel circuits PX via power lines. A level of the high voltage power VDD may be higher than a level of the low voltage power VSS.

The timing control unit 500 may generate control signals CTL1, CTL2, and CTL3. The timing control unit 500 may provide the control signals CTL1, CTL2, and CTL3 to the data driving unit 200, the scan driving unit 300, and the power supply unit 400 to control the data driving unit 200, the scan driving unit 300, and the power supply unit 400.

Therefore, the OLED display 1000 may have advantages of the current driving technique such as to reduce the effect of characteristic variation of transistor, hysteresis of transistor, and voltage drop. Also, the OLED display 1000 may have advantages of the digital driving technique such as a simple structure and to improve ability to express low gray scale. Moreover, the OLED display 1000 may solve the problem of disadvantage of the digital driving technique such as deterioration of the pixel. The OLED display 1000 may have the same voltage power in all pixels, thus, it is not need to separate the power voltage by RGB color pixel groups.

In addition, the pixel circuit PX included in the OLED display 1000 includes a plurality of sub-pixels sharing the current providing unit, thereby reducing the number of transistors and capacitors.

Figure 2:
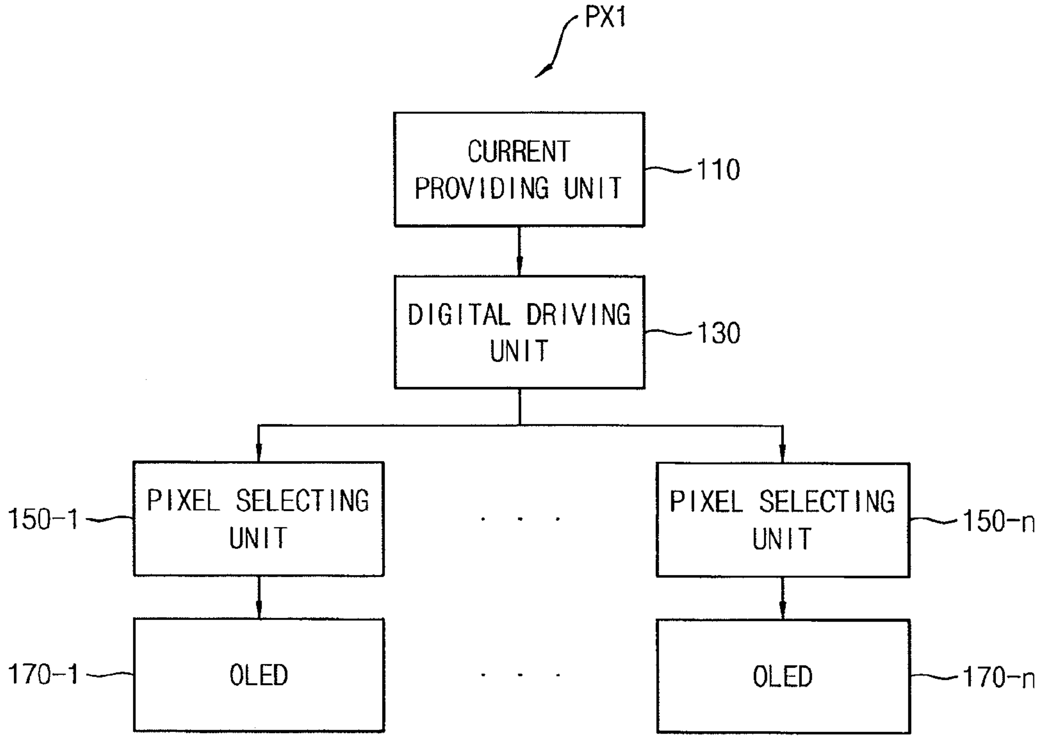
FIG. 2 is a block diagram illustrating an example of a pixel circuit included in the OLED display of FIG. 1.

FIG. 2 is a block diagram illustrating an example of a pixel circuit included in the OLED display of FIG. 1.

Referring to FIG. 2, a pixel circuit PX1 may include a current providing unit or current provider 110, a digital driving unit or digital driver 130, and a plurality of pixel selecting units or pixel selectors 150-1 through 150-*n*.

The current providing unit 110 may be connected to a current source. The current providing unit 110 may perform a current sinking operation caused by the current source in response to a first scan signal and may adjust a driving current based on the current sinking operation. The current source may generate a sinking current from the current providing unit 110. The current providing unit 110 may adjust the driving current based on the sinking current. For example, the sinking current flowing through the current source is determined to be the driving current.

The digital driving unit 130 may control a flow of the driving current provided from the current providing unit 110 in response to a data signal and a second scan signal. The digital driving unit 130 may receive the data signal and the second scan signal by the digital driving technique displaying one frame by displaying a plurality of sub-frames. The digital driving unit 130 may be provided from the current source and may provide the driving current to the pixel selecting units 150-1 through 150-n.

The pixel selecting units 150-1 through 150-n may provide the driving current provided from the digital driving unit 130 to each of OLEDs 170-1 through 170-n in response to a third scan signal. Each of the pixel selecting units 150-1 through 150-n may control the driving current provided from the digital driving unit 130 to flow through each of the OLEDs 170-1 through 170-n. In one example embodiment, the third scan signal is applied to the pixel selecting units 150-1 through 150-n via different scan lines. Thus, the third scan signal is applied to the pixel selecting units 150-1 through 150-n via different scan lines, thereby respectively driving the pixel selecting units 150-1 through 150-n included in the same pixel circuit PX1. In addition, the third scan signal applied to the pixel selecting units 150-1 through 150-n correspond to the second scan signal, thereby driving the OLEDs 170-1 through 170-n that are respectively connected to the pixel selecting units 150-1 through 150-n. In one example embodiment, the pixel selecting units 150-1 through 150-n may include a first pixel selecting unit configured to provide the driving current to a red color OLED, a second pixel selecting unit configured to provide the driving current to a green color OLED, and a third pixel selecting unit configured to provide the driving current to a blue color OLED. For example, the pixel selecting units 150-1 through 150-n may include red color, green color, and blue color OLEDs to make one pixel unit. Here, the red color OLED is an OLED emitting the red color light. The green color OLED is an OLED emitting the green color light. The blue color OLED is an OLED emitting the blue color light.

Figure 3:
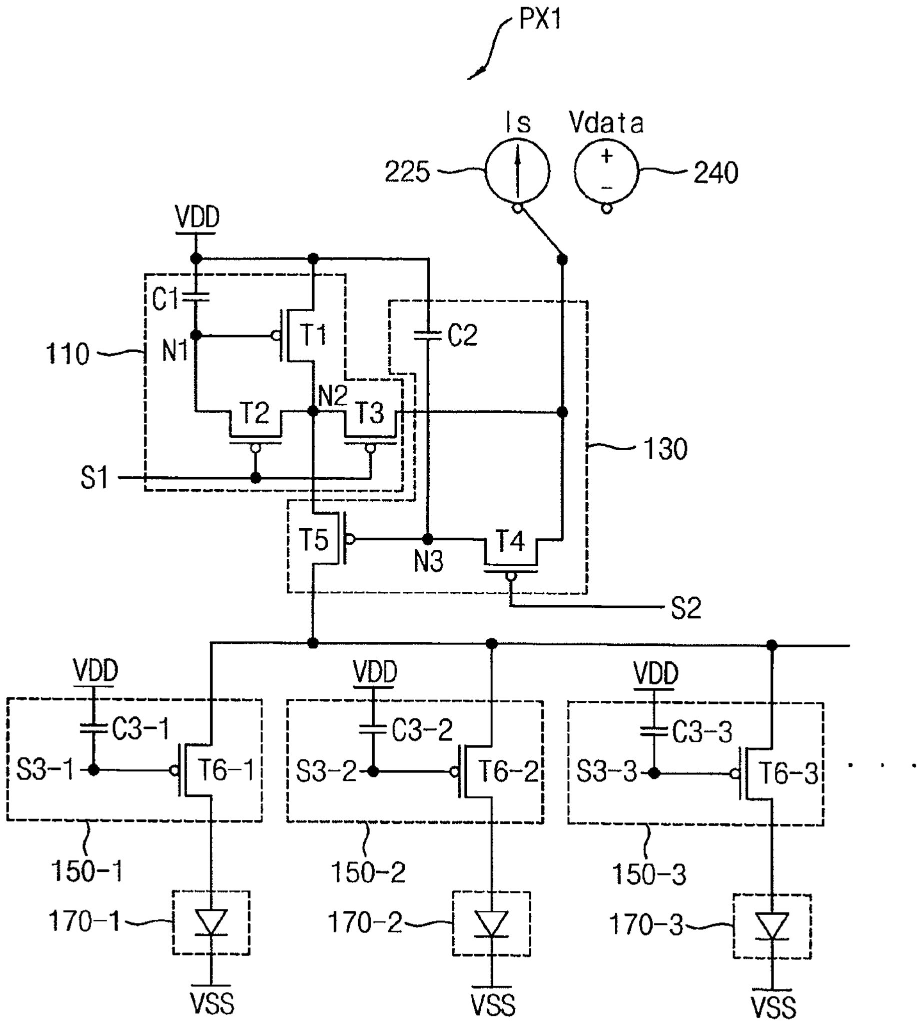
FIG. 3 is a circuit diagram illustrating an example of the pixel circuit of FIG. 2.

FIG. 3 is a circuit diagram illustrating an example of the pixel circuit of FIG. 2.

Referring to FIG. 3, a pixel circuit PX1 may include a plurality of transistors and a plurality of capacitors. In one example embodiment, the pixel circuit PX1 includes a plurality of PMOS transistors.

The current providing unit 110 may include a first transistor T1, a first capacitor C1, a second transistor T2, and a third transistor T3. The first transistor T1 may include a gate electrode connected to a first node N1, a first electrode to which a power supply voltage VDD is applied, and a second electrode connected to a second node N2. The first transistor T1 is a driving transistor. A current corresponding to a voltage difference between the gate electrode and the source electrode of the first transistor T1 may be flowed through the first transistor T1. The first capacitor C1 may include a first electrode to which the power supply voltage VDD is applied and a second electrode connected to the first node N1. The first capacitor C1 is a storage capacitor. The first capacitor C1 may store a driving voltage corresponding to a sinking current. The second transistor T2 may include a gate electrode to which the first scan signal S1 is applied, a first electrode connected to the first node N1, and a second electrode connected to the second node N2. The second transistor T2 may make a diode connection for the first transistor T1 in response to the first scan signal S1 to compensate a threshold voltage of the first transistor T1. The third transistor T3 may include a gate electrode to which the first scan signal S1 is applied, a first electrode connected to the second node N2, and a second electrode connected to the current source 225. The third transistor T3 may couple the current providing unit 110 to the current source 225 in response to the first scan signal S1.

The digital driving unit 130 may include a fourth transistor T4, a fifth transistor T5, and a second capacitor C2. The fourth transistor T4 may include a gate electrode to which the second scan signal S2 is applied, a first electrode to which the data signal Vdata is applied, and a second electrode connected to a third node N3. The fourth transistor T4 may apply the digital driving signal to a gate electrode of the fifth transistor T5 in response to the second scan signal S2 and the data signal Vdata received from the voltage driving unit 240. The fifth transistor T5 may include a gate electrode connected to the third node N3, a first electrode connected to the second node N2 of the current providing unit 110, and a second electrode connected to the pixel selecting units 150-1 through 150-n. The fifth transistor T5 may provide the driving current provided from the current providing unit 110 to the pixel selecting units 150-1 through 150-n in response to the digital driving signal. The second capacitor C2 may include a first electrode to which a power supply voltage VDD is applied and a second electrode connected to the third node N3. The second capacitor C2 may maintain a voltage of the third node N3.

The pixel selecting unit 150-1 may include a sixth transistor T6-1 and a third capacitor C3-1. The sixth transistor T6-1 may include a gate electrode to which the third scan signal S3-1 is applied, a first electrode connected to the digital driving unit 130, and a second electrode connected to the OLED 170-1. The sixth transistor T6-1 may provide the driving current provided from the digital driving unit 130 to the OLED 170-1 in response to the third scan signal S3-1. The OLED 170-1 may emit the light when the driving current is provided to the OLED 170-1. The luminance of the OLED 170-1 may be in proportion to the emission time of the OLED 170-1. The third capacitor C3 may include a first electrode to which a power supply voltage VDD is applied and a second electrode connected to the gate electrode of the sixth transistor T6-1. The third capacitor C3 may maintain a voltage of the gate electrode of the sixth transistor T6-1.

Therefore, the pixel circuit PX1 may drive the OLEDs 170-1, 170-2, 170-3, . . . respectively connected to the sub-pixels using the one current providing unit 110, thereby reducing the number of transistors and capacitors per pixel unit. For example, when three sub-pixels are shared the one current providing unit 110, the pixel circuit PX1 has about 2.7 transistors and about 1.7 capacitor per one OLED.

Figure 4:
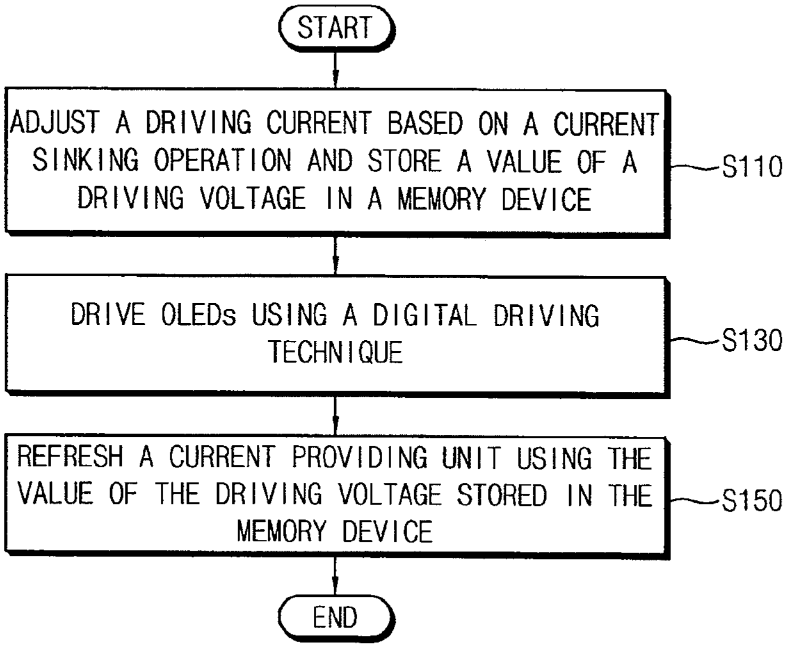
FIG. 4 is a flow chart illustrating a method of driving the OLED display of FIG. 1.
Figure 5:
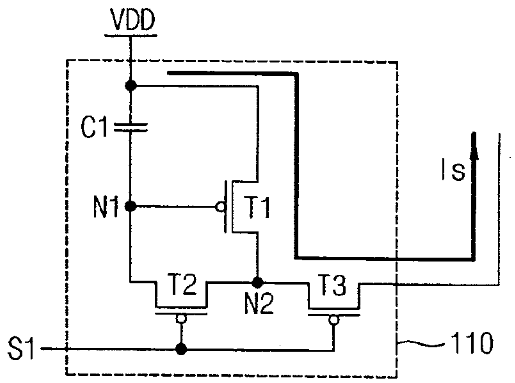
FIG. 5 is a diagram illustrating an example of a current sinking operation in the method of FIG. 4.
Figure 6:
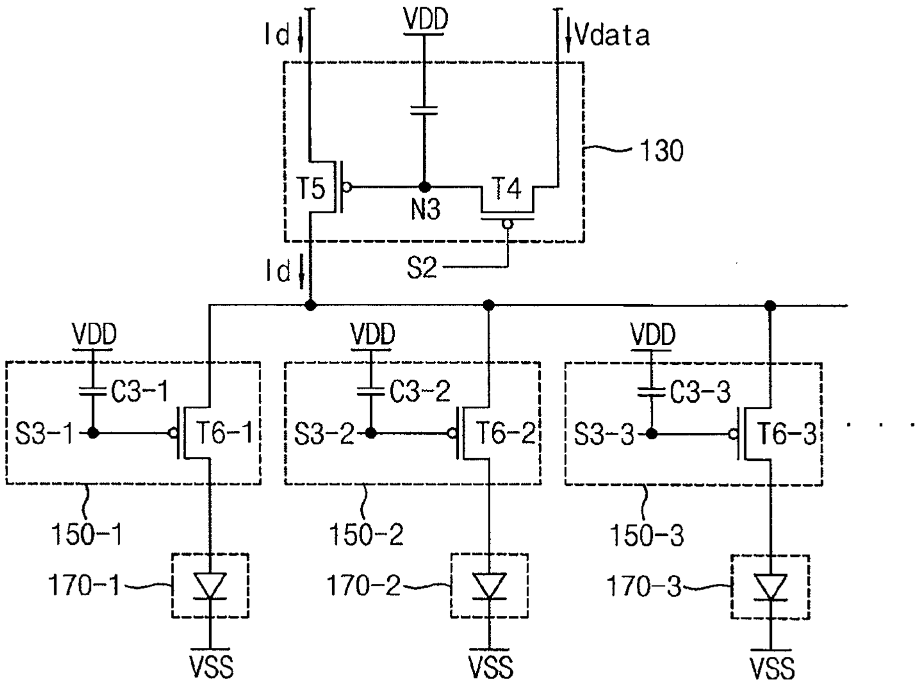
FIG. 6 is a diagram illustrating an example of driving an OLED using a digital driving technique in the method of FIG. 4.
Figure 7:
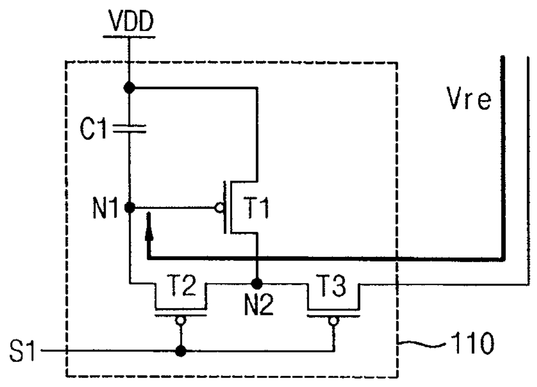
FIG. 7 is a diagram illustrating an example of a refresh operation using a driving voltage in the method of FIG. 4.

FIG. 4 is a flow chart illustrating a method of driving the OLED display of FIG. 1. FIG. 5 is a diagram illustrating an example of a current sinking operation in the method of FIG. 4. FIG. 6 is a diagram illustrating an example of driving an OLED using a digital driving method in the method of FIG. 4. FIG. 7 is a diagram illustrating an example of a refresh operation using a driving voltage in the method of FIG. 4.

In some embodiments, the FIG. 4 procedure is implemented in a conventional programming language, such as C or C++ or another suitable programming language. The program can be stored on a computer accessible storage medium of the OLED display 1000, for example, a memory (not shown) of the OLED display 1000. In certain embodiments, the storage medium includes a random access memory (RAM), hard disks, floppy disks, digital video devices, compact discs, video discs, and/or other optical storage mediums, etc. The program can be stored in the processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 8/7/Vista/2000/9x/ME/XP, Macintosh OS, OS X, OS/2, Android, iOS and the like. In another embodiment, at least part of the procedure can be implemented with embedded software. Depending on the embodiment, additional states can be added, others removed, or the order of the states changed in FIG. 4.

Referring to FIGS. 4 through 7, an OLED display may be driven using a driving technique mixed a current driving technique and a digital driving technique.

As shown in FIG. 5, the driving current is adjusted based on a current sinking operation S110. When a first scan signal S1 is applied to a current providing unit 110 included in a pixel circuit, a second transistor T2 and a third transistor T3 are turned on and the current providing unit 110 is connected to a current source. When the second transistor T2 and the third transistor T3 are turned on, a sinking current Is caused by the current source may be flowed through the first transistor T1. A voltage difference between a gate electrode and a source electrode of the first transistor T1 may be occurred. The voltage difference between the gate electrode and the source electrode of the first transistor T1 may be stored in a first capacitor C1 based on a current flowed through the second transistor T2. Thus, the sinking current Is is flowed through the first transistor T1 by a current sinking operation. The first capacitor C1 may be charged to driving voltage that is determined to control the driving current Id to flow through the pixel circuit. In addition, the value of the driving voltage may be stored in the memory device for a periodical refresh operation. For example, the value of the driving voltage may be stored in a frame memory included in a timing control unit.

The second transistor T2 and the third transistor T3 may be turned off to drive the OLEDs using the digital driving technique. When the second transistor T2 and the third transistor T3 are turned off, a voltage difference between the gate electrode and the source electrode of the first transistor T1 may be maintained because electric charge stored in the first capacitor C1 cannot be moved. Therefore, the current providing unit 110 may provide the driving current Id of which size equals to size of the sinking current Is to the digital driving unit 130. The effect according to a threshold voltage variation of transistor, mobility, and voltage drop may be reduced by fixing the driving current Id. Therefore, the OLED display may uniformly display the image.

As shown in FIG. 6, the OLED display may drive OLEDs 170-1, 170-2, 170-3, . . . using the digital driving technique S130.

The digital driving unit 130 may receive the data signal Vdata and the second scan signal S2 by the digital driving technique displaying one frame by displaying a plurality of sub-frames. In one example embodiment, the data signal Vdata and the second scan signal S2 may be applied by a digital driving technique of a progressive scan manner. In another example embodiment, the data signal Vdata and the second scan signal S2 may be applied by a digital driving technique of a random scan manner. The fourth transistor T4 included in the digital driving unit 130 may apply the digital driving signal to a gate electrode of the fifth transistor T5 in response to the second scan signal S2 and the data signal Vdata. The fifth transistor T5 included in the digital driving unit 130 may provide the driving current Id provided from the current providing unit 110 to the pixel selecting units 150-1, 150-2, 150-3, . . . in response to the digital driving signal. Therefore, the digital driving unit 130 may control a flow of the driving current Id provided from the current providing unit in response to a data signal Vdata and a second scan signal S2

Each of the pixel selecting units 150-1, 150-2, 150-3, . . . may control the driving current Id provided from the digital driving unit 130 to flow through each of the OLEDs 170-1, 170-2, 170-3, . . . . The sixth transistor T6-1 may provide the driving current Id provided from the digital driving unit 130 to the OLED 170-1 in response to the third scan signal S3-1. Therefore, the pixel selecting units 150-1, 150-2, 150-3, . . . may select the OLED emitting the light using the third scan signals S3-1, S3-2, S3-3, . . . . In one example embodiment, the third scan signals S3-1, S3-2, S3-3, . . . are applied to the pixel selecting units 150-1, 150-2, 150-3, . . . via different scan lines and the pixel selecting units 150-1, 150-2, 150-3 included in the same pixel circuit may be respectively driven. In one example embodiment, the pixel selecting units 150-1, 150-2, 150-3, . . . includes a first pixel selecting unit configured to provide the driving current Id to a red color OLED, a second pixel selecting unit configured to provide the driving current Id to a green color OLED, and a third pixel selecting unit configured to provide the driving current Id to a blue color OLED. For example, the pixel selecting units 150-1, 150-2, 150-3, . . . include red color, green color, and blue color OLEDs to make one pixel unit.

As shown in FIG. 7, the current providing unit 110 may be periodically refreshed using the value of the driving voltage stored in the memory device S150. Thus, the second transistor T2 and the third transistor T3 included in the current providing unit 110 are turned on such that a refresh voltage Vre corresponding to the value of the driving voltage stored in the memory device is applied to the first node N1. When the second transistor T2 and the third transistor T3 are turned off and the OLEDs are continuously driven using the digital driving technique, electric charge stored in the first capacitor C1 may be gradually leaked and the driving current may be changed, thereby decreasing the and emission luminance. Therefore, the current providing unit 110 may maintain the driving current by performing the periodical refresh operation. In one example embodiment, the refresh operation is substantially periodically performed by allocating at least one of sub-frames for refresh operation in the digital driving technique. For example, the refresh operation is performed in black insertion period of the digital driving technique. In another example embodiment, the refresh operation is performed according to the need by monitoring the sinking current. The refresh operation may be performed based on the current. The refresh operation may also be performed based on the voltage because of the charging time.

The OLED display may be driven using a driving technique mixed the current driving technique and the digital driving technique. Therefore, the OLED display may have advantages of the current driving technique such as to reduce the effect of characteristic variation of transistor, and hysteresis of transistor, voltage drop. Also, the OLED display may have advantages of the digital driving technique such as a simple structure, to improve ability to express low gray scale, etc.

Figure 8:
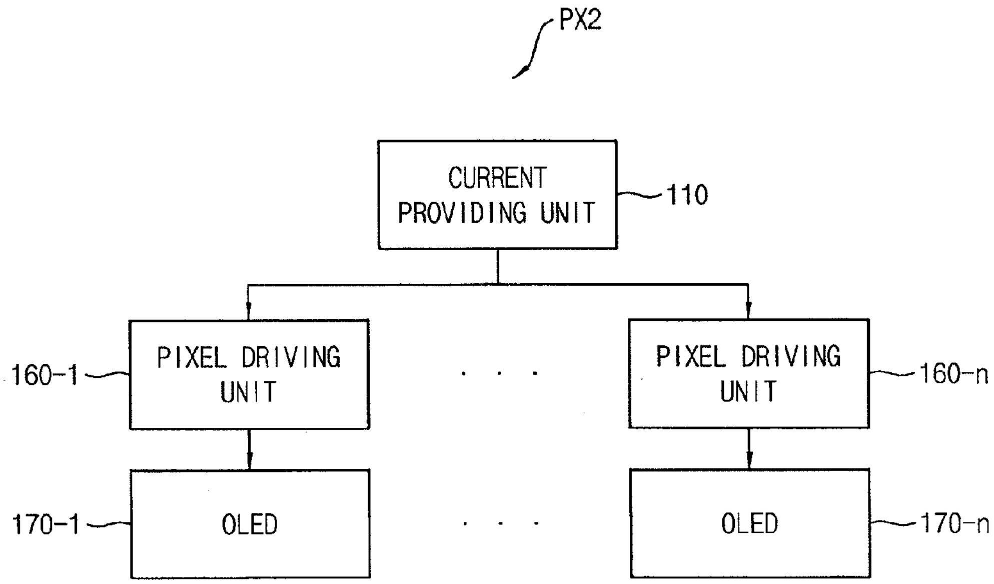
FIG. 8 is a block diagram illustrating another example of a pixel circuit included in the OLED display of FIG. 1.

FIG. 8 is a block diagram illustrating another example of a pixel circuit included in the OLED display of FIG. 1.

Referring to FIG. 8, the pixel circuit PX2 may include a current providing unit 110 and a plurality of pixel driving units 160-1 through 160-n.

The current providing unit 110 may be connected to a current source. The current providing unit 110 may perform a current sinking operation caused by the current source in response to a first scan signal and may adjust a driving current based on the current sinking operation. The current source may generate a sinking current from the current providing unit 110. The current providing unit 110 may adjust the driving current based on the sinking current. For example, the sinking current flowing through the current source is determined to be the driving current.

The pixel driving units 160-1 through 160-n may provide the driving current provided from the current providing unit 110 to OLEDs 170-1 through 170-n in response to a data signal and a fourth scan signal. Each of the pixel driving units 160-1 through 160-n may receive the data signal and the fourth scan signal by the digital driving technique and may drive the OLEDs 170-1 through 170-n using the digital driving technique. In one example embodiment, the fourth scan signal is applied to the pixel driving units 160-1 through 160-n via the same scan line. Thus, the fourth scan signal is applied to the pixel driving units 160-1 through 160-n via the same scan line, thereafter the pixel driving units 160-1 through 160-n are respectively driven by data signals such that the OLEDs 170-1 through 170-n sharing the current providing unit 110 emit the light. In another example embodiment, the fourth scan signal may be applied to the pixel driving units 160-1 through 160-n via different scan lines. Thus, the fourth scan signal is applied to the pixel driving units 160-1 through 160-n via different scan lines such that the OLEDs 170-1 through 170-n included in the same pixel circuit PX2 are respectively driven. In one example embodiment, the pixel driving units 160-1 through 160-n may include a first pixel driving unit configured to provide the driving current to a red color OLED, a second pixel driving unit configured to provide the driving current to a green color OLED, and a third pixel driving unit configured to provide the driving current to a blue color OLED. For example, the pixel driving units 160-1 through 160-n includes red color, green color, and blue color OLEDs to make one pixel unit.

Figure 9:
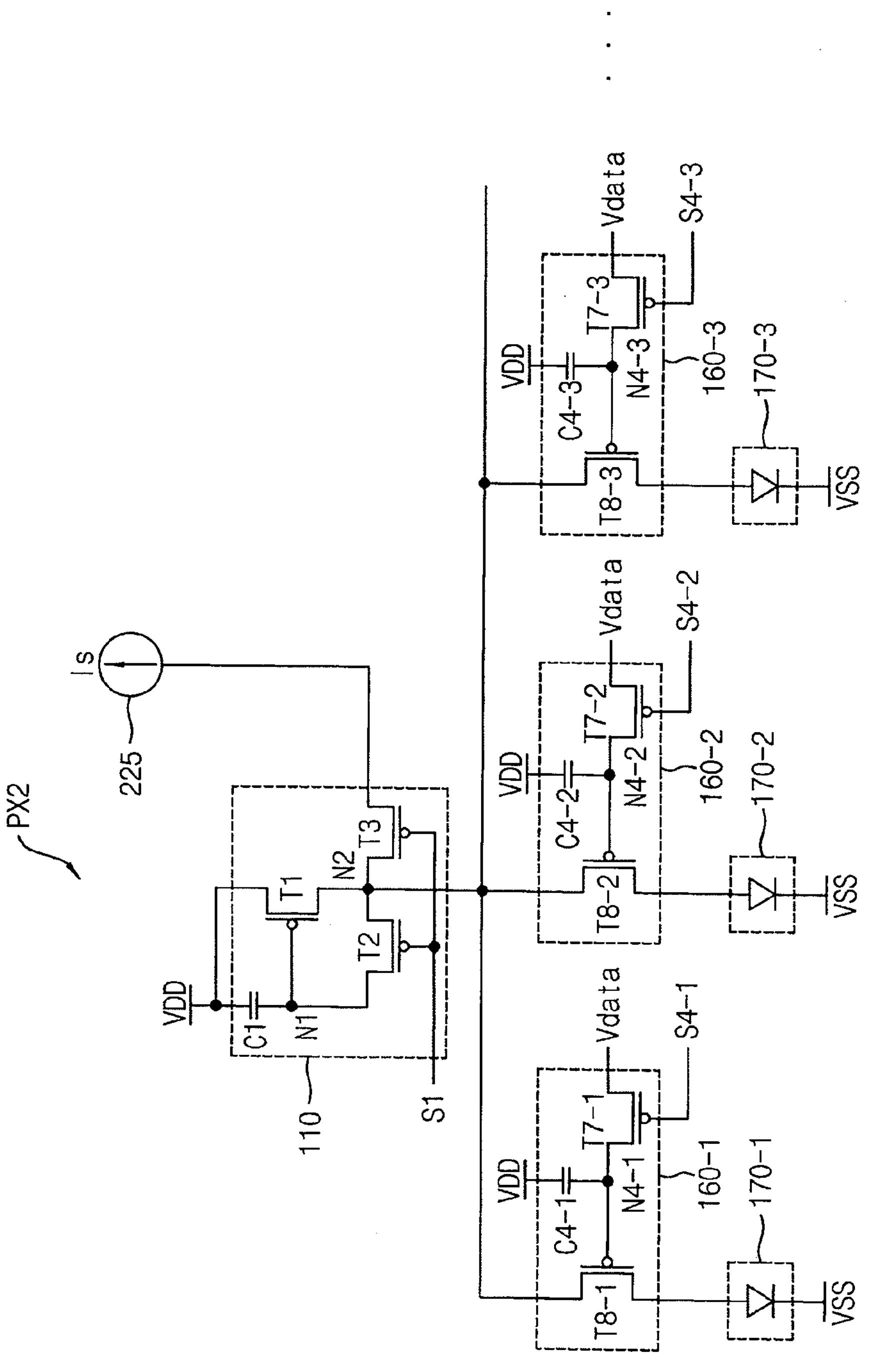
FIG. 9 is a circuit diagram illustrating an example of the pixel circuit of FIG. 8.

FIG. 9 is a circuit diagram illustrating an example of the pixel circuit of FIG. 8.

Referring to FIG. 9, the pixel circuit PX2 may include a plurality of transistors and a plurality of capacitors. In one example embodiment, the pixel circuit PX2 includes a plurality of PMOS transistors.

The current providing unit 110 may include a first transistor T1, a first capacitor C1, a second transistor T2, and a third transistor T3. The first transistor T1 may include a gate electrode connected to a first node N1, a first electrode to which a power supply voltage VDD is applied, and a second electrode connected to a second node N2. The first capacitor C1 may include a first electrode to which the power supply voltage VDD is applied and a second electrode connected to the first node N1. The second transistor T2 may include a gate electrode to which the first scan signal S1 is applied, a first electrode connected to the first node N1, and a second electrode connected to the second node N2. The third transistor T3 may include a gate electrode to which the first scan signal S1 is applied, a first electrode connected to the second node N2, and a second electrode connected to the current source 225. The current providing unit 110 according to the present exemplary embodiment is substantially the same as the current providing unit of the exemplary embodiment described in FIG. 3, except that the current providing unit 110 provides the driving current to the pixel driving units 160-1 through 160-n. Therefore, the same reference numerals will be used to refer to the same or like parts as those described in the previous exemplary embodiment of FIG. 3, and any repetitive explanation concerning the above elements will be omitted.

The pixel driving unit 160-1 may include a seventh transistor T7-1, an eighth transistor T8-1, and a fourth capacitor C4-1. The seventh transistor T7-1 may include a gate electrode to which the fourth scan signal S4-1 is applied, a first electrode to which the data signal Vdata is applied, and a second electrode connected to a fourth node N4-1. The seventh transistor T7-1 may apply the digital driving signal to a gate electrode of the eighth transistor T8-1 in response to the fourth scan signal S4-1. The eighth transistor T8-1 may include a gate electrode connected to the fourth node N4-1, a first electrode connected to the current providing unit 110, and a second electrode connected to the OLED 170-1. The eighth transistor T8-1 may provide the driving current provided from the current providing unit 110 to the OLED 170-1 in response to the digital driving signal. The fourth capacitor C4-1 may include a first electrode to which a power supply voltage VDD is applied and a second electrode connected to the fourth node N4-1. The fourth capacitor C4-1 may maintain a voltage of the fourth node N4-1.

The pixel circuit PX2 may adjust the driving current based on the current sinking operation. A driving voltage may be determined to control the driving current to flow through the OLEDs 170-1, 170-2, 170-3, . . . . A value of the driving current may be stored in the memory device. The pixel circuit PX2 may drive the OLEDs 170-1, 170-2, 170-3, . . . using the digital driving technique. The current providing unit 110 may be periodically refreshed using the value of the driving voltage stored in the memory device. The method of the driving the OLED display is described above, duplicated descriptions will be omitted.

Therefore, the pixel circuit PX2 may drive the OLEDs 170-1, 170-2, 170-3, . . . respectively connected to the sub-pixels using the one current providing unit 110, thereby reducing the number of transistors and capacitors per pixel unit. For example, when three sub-pixels are shared the one current providing unit 110, the pixel circuit PX2 has 2 transistors and about 1.3 capacitor per one OLED.

The present inventive concept may be applied to an electronic device having the OLED display. For example, the present inventive concept may be applied to a cellular phone, a smart phone, a smart pad, a personal digital assistant (PDA), etc.

The foregoing is illustrative of example embodiments and is not to be construed as limiting thereof. Although the inventive technology has been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A pixel circuit for an organic light-emitting diode (OLED) display, the pixel circuit comprising:

a current provider electrically connected to a current source and configured to perform a current sinking operation in response to a first scan signal and to adjust a driving current based on the current sinking operation;

a digital driver configured to control a flow of the driving current provided from the current provider in response to a data signal and a second scan signal; and a plurality of pixel selectors configured to provide the driving current received from the digital driver to an OLED in response to a third scan signal, wherein the current provider includes:

a first transistor including a gate electrode connected to a first node, a first electrode to which a first power supply voltage is applied, and a second electrode connected to a second node;

a second transistor including a gate electrode to which the first scan signal is applied, a first electrode connected to the first node, and a second electrode connected to the second node; and a third transistor including a gate electrode to which the first scan signal is applied, a first electrode connected to the second node, and a second electrode connected to the current source, wherein the digital driver includes:

a fourth transistor including a gate electrode to which the second scan signal is applied, a first electrode to which the data signal is applied, and a second electrode connected to a third node; and a fifth transistor including a gate electrode connected to the third node, a first electrode connected to the current provider, and a second electrode connected to the pixel selectors, wherein the second node is directly connected to all of the first, second, third and fifth transistors.

2. The pixel circuit of claim 1, wherein the current provider further includes:

a first capacitor including a first electrode to which the first power supply voltage is applied and a second electrode connected to the first node.

3. The pixel circuit of claim 1, wherein the digital driver further includes:

a second capacitor including a first electrode to which the first power supply voltage is applied and a second electrode connected to the third node.

4. The pixel circuit of claim 1, wherein each of the pixel selectors includes:

a sixth transistor including a gate electrode to which the third scan signal is applied, a first electrode connected to the digital driver, and a second electrode connected to the OLED; and a third capacitor including a first electrode to which a second power supply voltage is applied and a second electrode connected to the gate electrode of the sixth transistor.

5. The pixel circuit of claim 1, wherein the pixel selectors are configured to receive the third scan signal via different scan lines.

6. The pixel circuit of claim 1, wherein the pixel selectors include a first pixel selector configured to provide the driving current to a red color OLED, a second pixel selector configured to provide the driving current to a green color OLED, and a third pixel selector configured to provide the driving current to a blue color OLED.

7. A pixel circuit for an organic light-emitting diode (OLED) display, the pixel circuit comprising:

a current provider electrically connected to a current source and configured to perform a current sinking operation in response to a first scan signal and to adjust a driving current based on the current sinking operation; and a plurality of pixel drivers configured to provide the driving current received from the current provider to an OLED in response to a data signal and a fourth scan signal, wherein the current provider further includes:

a first transistor including a gate electrode connected to a first node, a first electrode to which a first power supply voltage is applied, and a second electrode connected to a second node;

a second transistor including a gate electrode to which the first scan signal is applied, a first electrode connected to the first node, and a second electrode connected to the second node; and a third transistor including a gate electrode to which the first scan signal is applied, a first electrode connected to the second node, and a second electrode connected to the current source, wherein each of the pixel drivers further includes:

a seventh transistor including a gate electrode to which the fourth scan signal is applied, a first electrode to which the data signal is applied, and a second electrode connected to a fourth node; and an eighth transistor including a gate electrode connected to the fourth node, a first electrode connected to the current provider, and a second electrode connected to the OLED, wherein the second node is directly connected to all of the first, second, third and eighth transistors.

8. The pixel circuit of claim 7, wherein the current provider further includes:

a first capacitor including a first electrode to which the first power supply voltage is applied and a second electrode connected to the first node.

9. The pixel circuit of claim 7, wherein each of the pixel drivers further includes:

a fourth capacitor including a first electrode to which a second power supply voltage is applied and a second electrode connected to the fourth node.

10. The pixel circuit of claim 7, wherein the pixel drivers are configured to receive the fourth scan signal via the same scan line.

11. The pixel circuit of claim 7, wherein the pixel drivers are configured to receive the fourth scan signal via different scan lines.

12. The pixel circuit of claim 7, wherein the pixel drivers include a first pixel driver configured to provide the driving current to a red color OLED, a second pixel driver configured to provide the driving current to a green color OLED, and a third pixel driver configured to provide the driving current to a blue color OLED.

13. An organic light-emitting diode (OLED) display comprising:

a display panel including a plurality of pixel circuits;

a scan driver configured to provide a first scan signal, a second scan signal, and a third scan signal to the pixel circuits;

a data driver configured to provide a data signal to the pixel circuits and to determine a driving current based on a current source included in the data driver; and a timing controller configured to control the scan driver and the data driver, wherein each of the pixel circuits includes:

a current provider electrically connected to the current source and configured to perform a current sinking operation in response to the first scan signal and to adjust the driving current based on the current sinking operation;

a digital driver configured to control a flow of the driving current provided from the current provider in response to the data signal and the second scan signal; and a plurality of pixel selectors configured to provide the driving current received from the digital driver to an OLED in response to the third scan signal, wherein the current provider includes:

a first transistor including a gate electrode connected to a first node, a first electrode to which a first power supply voltage is applied, and a second electrode connected to a second node;

a second transistor including a gate electrode to which the first scan signal is applied, a first electrode connected to the first node, and a second electrode connected to the second node; and a third transistor including a gate electrode to which the first scan signal is applied, a first electrode connected to the second node, and a second electrode connected to the current source, wherein the digital driver includes:

a fourth transistor including a gate electrode to which the second scan signal is applied, a first electrode to which the data signal is applied, and a second electrode connected to a third node; and a fifth transistor including a gate electrode connected to the third node, a first electrode connected to the current provider, and a second electrode connected to the pixel selectors, wherein the second node is directly connected to all of the first, second, third and fifth transistors.

14. The device of the claim 13, wherein the data driver includes:

a voltage driver configured to provide the data signal to the pixel circuits; and a current driver configured to determine the driving current based on the current sinking operation on each of the pixel circuits.

15. The device of the claim 14, wherein the voltage driver is configured to provide the data signal based on a digital driving technique in which one frame is divided into a plurality of sub-frames.

16. The device of the claim 14, wherein the current driver stores a value of a driving voltage in a memory device, the driving voltage being determined to control the driving current to flow through the OLED.

17. The device of the claim 16, wherein the current driver is configured to substantially periodically refresh the current provider based on the value of the driving voltage stored in the memory device.

18. The device of the claim 14, wherein a sinking current flowing through the current source represents the driving current.

19. The device of the claim 13, wherein the pixel selectors are configured to receive the third scan signal via different scan lines.

20. The device of the claim 13, wherein the pixel selectors include a first pixel selector configured to provide the driving current to a red color OLED, a second pixel selector configured to provide the driving current to a green color OLED, and a third pixel selector configured to provide the driving current to a blue color OLED.

* * * * *